Patented May 4, 1937

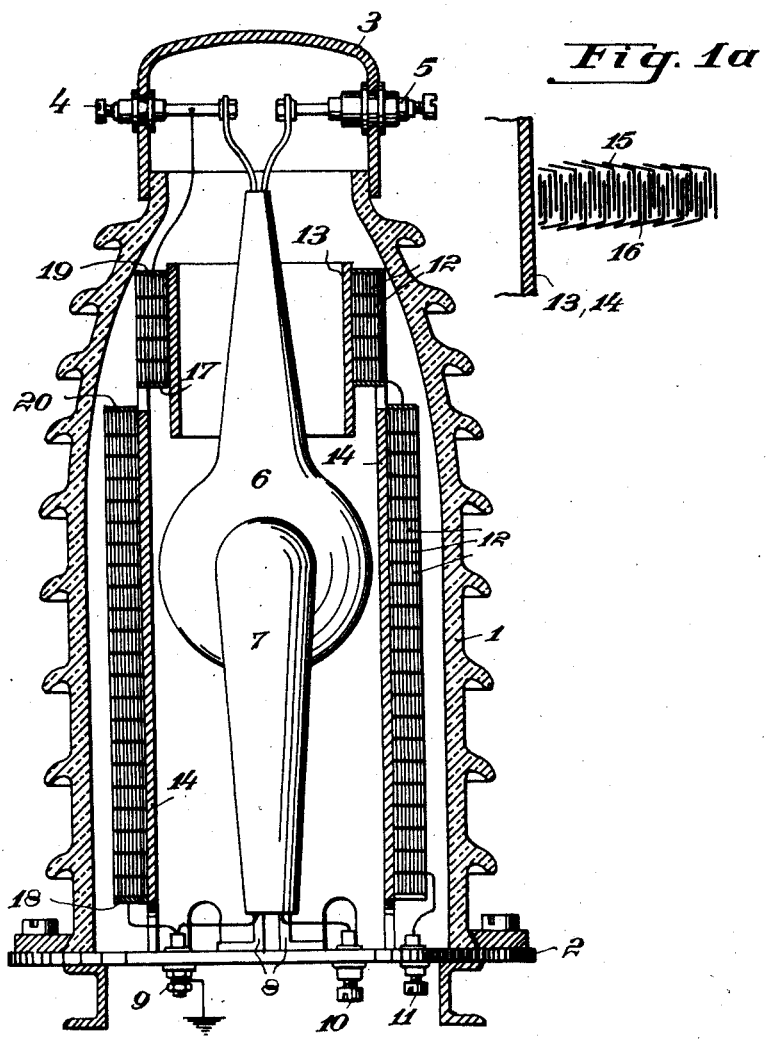

2,079,071

UNITED STATES PATENT OFFICE 2,079,071

COMBINATION OF CURRENT TRANSFORMER AND MEASURING CONDENSER

Georg Keinath, Berlin-Charlottenburg, Germany, assignor to Siemens & Halske, Aktiengesellschaft, Siemensstadt, near Berlin, Germany, a corporation of Germany Application August 9, 1934, Serial No. 739,099
In Germany August 9, 1933

3 Claims. (Cl. 175—358)

This invention relates to current transformers, which are combined with measuring condensers and operate at high voltage.

In order to waste no space the active parts of current transformers, such as primary and secondary windings, are arranged in a casing, suitably filled with oil. The side walls of this casing are made of insulating material.

This invention relates to means for improving such current transformers in two directions. It is one object of the invention to diminish the dimensions of current transformers, particularly their height. But even if the dimensions are not decreased, the safety of working is improved by means of constructions according to this invention. Apart from this these means form an arrangement for measuring voltages.

It is the object of the invention to provide a plurality of condensers in the insulating casing so arranged that they are connected in series and to provide a uniform voltage distribution from top to bottom along the insulating wall of the casing. The potential decreases from one condenser to the other. These condensers are used without ceremony for measuring voltages and distribute on the other hand the potential drop along the insulating wall. For this reason it is possible to decrease the length of the insulating wall, or the safety of working increases, if the length of the insulating wall is kept unchanged.

It is another object of the invention to arrange in the casing several ring-shaped or annular condensers one upon the other, which form a hollow cylinder, surrounding the active parts of a current transformer.

The invention will be better understood from the following description taken in connection with the accompanying drawing. Fig. 1 is a vertical sectional view of a current transformer combined with measuring condensers. Fig. 1a is a sectional view of the arrangement of the insulating and the conducting layers of one condenser element.

Referring more particularly to Fig. 1 an insulating wall 1 of the casing of the current transformer is illustrated, having a ground plate 2 of conducting material, forming an oil-tight closure for the casing. The casing bears on its top a cap 3 of conducting material, forming a solid closure for the insulating wall. This cap possesses two current leads 4 and 5; one is electrically connected with the cap, while the other is insulated therefrom. The high tension winding of the current transformer is illustrated at 6, forming a ring which is suitably bound with bands of insulating material. 7 is the core of the current transformer with the low tension winding. This core rests on supports 8 of conducting material, secured to the ground plate 2. The low tension winding and supports possess a wrapping of insulating band or tape as described above in connection with the high tension winding. 9 to 11 are insulated screws or terminals, passing through ground plate of current transformer and forming connections for measuring devices.

The condenser is composed of a plurality of ring-shaped condenser elements 12, secured on tubes 13 and 14 of insulating material. In order to conform the outer shape of the condenser arrangement to the inner shape of casing 1, condensers of different diameters are used.

The annular condenser elements or units are preferably constructed as annular spirally-wound coils, in a manner well-known in the art. That is to say, two conducting strips are placed on opposite sides of a separating strip or band of insulating material, and these three strips are then wound into a coil the spiral convolutions of which are separated by a second insulating strip and are parallel to each other. However, instead of being placed exactly opposite each other on the two sides of the insulating strip so as to be covered thereby at both edges, as is usual in such coils, the two conducting strips are offset lengthwise of the coil axis, so that one of the conducting strips will project beyond the insulating strip at one edge of the latter, while the other conducting strip will project beyond the coiled insulating strip at the other edge or face of the coil. The projecting portions of the conducting strips are then bent inwardly, toward the axis of the coil, and thus, when two such spirally-wound condenser elements or units are superposed, the bent portions at the top of one of the conducting strips of the lower element will be in contact with the bent portions at the bottom of the other conducting strip of the upper element, as will be evident from Fig. 1a, where 15 indicates the projecting portions at the top of one of the conducting strips, and 16 the projecting portions at the bottom of the other conducting strip. By this arrangement I am enabled to dispense with separate conductors for the series connection of superposed condenser elements. The condenser elements are secured on the insulating tubes by rings 17 and 18 of conducting material, fastened on these tubes. These rings form simultaneously connections to the condensers resting thereon in contact with the adjacent parts of their conducting layers, which are bent over towards the insulating tube. In the same way two rings 19 and 20 of conducting material form connections with the upper condenser elements of each of the two sets, said elements being covered by these rings.

Connections with the condensers are made by connecting only the ring 19 with the terminal 4 or 5 and the ring 18 with one of the terminals 9 to 11, whilst the ring 17 is connected with ring 20.

At its lower edge openings are arranged in the insulating tube 14 for the circulation of oil. Thereby it is possible to fix the tube 14 on the ground plate 2, which bears therefore all the weight of the condenser arrangement.

In the device shown in Fig. 1, the series-arranged condensers are connected immediately to the earthing terminal 9, which is also connected to one end of the low tension winding. The other end of the low tension winding is connected to terminal 10. An intermediate point of the series condenser stack near grounded plate 18 is connected to terminal 11. By connecting a voltmeter to terminals 9 and 11 it is possible to take the measurement of the voltage applied to the lowest condenser element. An ammeter could be connected between the binding posts 9 and 10. The arrangement of Fig. 1 is a preferred embodiment of the invention, but it will be apparent that changes may be made without departing from the scope of the invention.

I claim as my invention:

1. An instrument adapter for electrical measurements in high-tension alternating current lines, comprising an inductive single step current transformer for connection to an ammeter, a set of series-connected condenser elements surrounding said transformer and coaxial therewith and interposed between the high tension line and ground, and means for connecting one of the intermediate elements of said condenser set and ground to a voltmeter.

2. An instrument adapter for electrical measurements in high tension alternating current lines, comprising an insulating casing tightly closed at the top and bottom and adapted to be filled with oil, an inductive single step current transformer located within said casing and surrounded thereby, said transformer being adapted for connection to an ammeter, the primary of said transformer having terminals for direct connection with the high tension line, a set of series-connected condenser elements enclosed within said insulating casing and surrounding said transformer and coaxial therewith, said condenser set being interposed between the high tension line and ground, and means for connecting one of the intermediate elements of said condenser set and ground to a voltmeter, said condenser set also serving to distribute the potential.

3. An instrument adapter for electrical measurements in high tension alternating current lines, comprising, an insulating casing tightly closed at the top and bottom and adapted to be filled with oil, an inductive single-step current transformer located within said casing and surrounded thereby, said transformer being adapted for connection to an ammeter, the primary of said transformer having terminals for direct connection with the high tension line, a set of annular series-connected condenser elements within said casing and stacked lengthwise thereof and surrounding said transformer, said set of condenser elements being disposed coaxially with respect to said transformer and interposed between the high tension line and ground so that potential within said set will decrease step-wise from one condenser element to the next lengthwise of said casing, each of said condenser elements comprising conducting members and insulating means separating such members, said members having portions which project beyond the insulating means at opposite edges thereof and which are bent laterally to adapt them for contact with mating conducting portions of adjacent condenser elements, and means for connecting one of the intermediate elements of said condenser set and ground to a voltmeter.

GEORG KEINATH.